US012667515B1

(12) United States Patent
Su et al.

(10) Patent No.: US 12,667,515 B1
(45) Date of Patent: Jun. 30, 2026

(54) MASSAGE DEVICE

(71) Applicant: DONGGUAN YANSHI ELECTRONIC TECHNOLOGY CO., LTD., Dongguan (CN)

(72) Inventors: Yanyan Su, Hefei (CN); Wenqiang Wu, Jingzhou (CN)

(73) Assignee: DONGGUAN YANSHI ELECTRONIC TECHNOLOGY CO., LTD., Dongguan (CN)

(*) Notice: Subject to any disclaimer, the term of this patent is extended or adjusted under 35 U.S.C. 154(b) by 0 days.

(21) Appl. No.: 19/331,187

(22) Filed: Sep. 17, 2025

(51) Int. Cl.

| | |
|---|---|
| ***A61H 19/00*** | (2006.01) |
| ***A61H 7/00*** | (2006.01) |
| ***A61H 23/00*** | (2006.01) |
| ***A61H 23/02*** | (2006.01) |

(52) U.S. Cl.
CPC ............. *A61H 19/32* (2013.01); *A61H 7/001* (2013.01); *A61H 23/006* (2013.01); *A61H 23/0254* (2013.01); *A61H 2201/0165* (2013.01); *A61H 2201/1676* (2013.01); *A61H 2201/5002* (2013.01); *A61H 2201/5005* (2013.01); *A61H 2205/087* (2013.01)

(58) Field of Classification Search
CPC ...................................................... A61H 19/32
See application file for complete search history.

(56) References Cited

U.S. PATENT DOCUMENTS

| | | | | |
|---|---|---|---|---|
| 12,303,450 B1 * | 5/2025 | Cheng | ..................... | A61H 19/50 |
| 2023/0126338 A1 * | 4/2023 | Shao | .................. | A61H 15/0078 600/38 |

FOREIGN PATENT DOCUMENTS

| | | | | |
|---|---|---|---|---|
| CN | 103876913 A | 6/2014 | | |
| CN | 114404814 A | 4/2022 | | |
| DE | 202024106033 U1 * | 11/2024 | ......... | A61H 23/0254 |

* cited by examiner

*Primary Examiner* — Thaddeus B Cox
(74) *Attorney, Agent, or Firm* — Ming Jiang; OPENPTO US LLC

(57) ABSTRACT

A massage device includes a second massage body and a first massage body provided with an inlet, where the first massage body is provided with a massage cavity, the inlet is communicated with the massage cavity, and the massage cavity is configured to massage a first massage area. The second massage body is connected to the first massage body through a first connection portion, and the first connection portion is located at a position of the first massage body adjacent to the inlet. The second massage body has an elastic thin-shell shape, wraps and elastically compresses a second massage area, and the first massage area and the second massage area belong to different regions of a human body. The massage device provided in an embodiment of the present disclosure is capable of performing coordinated massage on a plurality of correlated regions.

16 Claims, 8 Drawing Sheets

MASSAGE DEVICE

CROSS REFERENCE TO RELATED APPLICATIONS

The present disclosure claims priorities of Chinese Patent Application No. 202511152663X, filed to China National Intellectual Property Administration on Aug. 15, 2025, the entire contents of which are hereby incorporated by reference in entirety.

TECHNICAL FIELD

The present disclosure relates to the technical field of sex toys, and in particular to a massage device.

BACKGROUND

In the field of human healthcare, massage therapies for specific body parts are of great significance for promoting local blood circulation, relieving fatigue, and improving physiological conditions. The human body has a plurality of physiological regions with high correlation, and synergistic healthcare for these physiological regions gradually becomes increasingly important in daily care.

Most traditional massage devices only achieve massage on a single region, and hardly meet the needs for collaborative care of a plurality of correlated regions. Although some multi-functional massage devices may achieve massage of a plurality of body regions, their structural designs have obvious deficiencies. For example, reasonable mechanical cooperation between massage structures corresponding to different body regions is insufficient, thereby resulting in an imbalance in the massage intensity; or an improper design of structure connection ways results in poor fit of a massage device when worn and cannot adapt to physiological differences of different users.

In the prior art, a rigid contact design is usually adopted for a massage assembly for a certain correlated region, which easily causes local compression discomfort; and for a massage cavity structure of another correlated region, the coordinated cooperation with massage assemblies for adjacent regions is usually ignored, thereby resulting in the unsatisfactory overall massage effect and failure to give full play to the role of multi-region synergistic healthcare. Therefore, there is an urgent need for an integrated device capable of achieving coordinated, comfortable, and efficient massage for a plurality of correlated physiological regions.

SUMMARY

In view of the above problems, an objective of the present disclosure is to provide a massage device capable of performing coordinated massage on a plurality of correlated regions, so as to alleviate the above problems.

The present disclosure is achieved by means of the following technical solution:

The present disclosure provides a massage device, and the massage device includes a second massage body and a first massage body provided with an inlet, where the first massage body is provided with a massage cavity, the inlet is communicated with the massage cavity, and the massage cavity is configured to massage a first massage area; the second massage body is connected to the first massage body through a first connection portion, and the first connection portion is located at a position of the first massage body adjacent to the inlet; and the second massage body has an elastic thin-shell shape, wraps and elastically compresses a second massage area, and the first massage area and the second massage area belong to different regions of a human body.

According to the technical solutions in the embodiments of the present disclosure, the user first aligns the first massage area with the inlet of the first massage body, such that the first massage area naturally enters the massage cavity communicated with the inlet, and in this case, the massage cavity fits a contour of the first massage area to achieve targeted wrapping. Since the first connection portion is located at the position of the first massage body adjacent to the inlet, the second massage body is stably connected to the first massage body through the first connection portion, such that the position of the second massage body is close to the inlet of the first massage body, and the second massage area is wrapped in the elastic thin-shell shape. The massage cavity of the first massage body provides a contour-fitting support for the first massage area, which achieves a basic massage function through a cavity structure; and additionally, the second massage body exerts uniform elastic compression on the second massage area by using its own elastic characteristics, and the flexible wrapping method adapts to differences in physiological characteristics of different users. The massage device provided by the present disclosure achieves collaborative care for the first massage area and the second massage area; the elastic thin-shell design of the second massage body prevents compression discomfort caused by rigid contact and enhances contact comfort; and the position design of the first connection portion ensures rational mechanical cooperation between the two massage bodies, enhances stability of the massage device during use, and prevents impairment to the massage effect caused by shaking, thereby fully leveraging the role of synergistic healthcare for a plurality of massage areas.

In some embodiments, the massage device further includes a first vibration assembly provided with a conductive output portion, where the first vibration assembly is disposed on the first connection portion or in an area adjacent to the first connection portion, and the conductive output portion is located in the second massage body and configured to output vibration energy to the second massage body.

According to the technical solutions in the embodiments of the present disclosure, the vibration energy generated by the first vibration assembly is efficiently transmitted to the second massage body through the conductive output portion. Since the conductive output portion directly acts on an interior of the second massage body, the vibration energy is absorbed by the second massage body almost without loss, which is converted into high-frequency flexible vibration massage for the second massage area. During use, the massage cavity of the first massage body continues to provide a massage effect on the first massage area, and elastic compression by the second massage body superimposes a dynamic massage effect from the vibration energy. The massage device provided by the present disclosure achieves targeted vibration massage on the second massage area through directional energy output of the conductive output portion, which solves the problems of traditional massage devices including vibration energy dispersion and inaccurate massage; the first vibration assembly is arranged close to the first connection portion, which shortens a vibration transmission path, reduces energy dissipation, and ensures a stable vibration intensity; and thirdly, a synergistic action of vibration massage and elastic compression achieves a better effect of blood circulation and muscle relaxation of the second massage area.

In some embodiments, the massage device further includes a second connection portion; the second connection portion is disposed in the second massage body and arranged close to the first connection portion; the second connection portion is configured to fix the conductive output portion; the conductive output portion has both a vibration damping path and a vibration excitation path; the vibration damping path includes a first vibration transmission path L1 from the conductive output portion to the first massage body, and the first vibration transmission path L1 is a direct vibration transmission path from the conductive output portion to the first massage body; the vibration excitation path includes a second vibration transmission path L2 from the conductive output portion to the second massage body, and the second vibration transmission path L2 is a direct vibration transmission path from the conductive output portion to the second massage body; and a vibration intensity and/or energy transmitted by the conductive output portion along the vibration damping path is less than a vibration intensity and/or energy transmitted along the vibration excitation path.

According to the technical solutions in the embodiments of the present disclosure, in the vibration excitation path, the conductive output portion directly outputs vibration energy to the second massage body through the second vibration transmission path L2, and since the vibration excitation path is a direct vibration transmission path, energy dissipation is minimal, and the second massage body efficiently receives vibration and converts the vibration into a dynamic massage force for the second massage area. In the vibration damping path, when the conductive output portion transmits a vibration to the first massage body through the first vibration transmission path L1, the energy is effectively weakened, such that an intensity of vibration received by the first massage body is much lower than that of the second massage body. For the massage device provided by the present disclosure, a fixing effect of the second connection portion ensures position stability of the conductive output portion, and prevents the decrease in energy transmission efficiency caused by component loosening during vibration; the differential design of the vibration damping path and the vibration excitation path achieves directional distribution of vibration energy, such that stronger vibration massage on the second massage area is achieved, and the vibration interference of the first massage body is reduced, which solves the problem of functional redundancy caused by vibration diffusion of traditional devices; and the precise distribution of vibration energy improves an energy efficiency ratio of the massage device, and ensures that more energy is used for effective massage areas.

In some embodiments, the vibration damping path further includes a third vibration transmission path L3, where the third vibration transmission path L3 includes a vibration transmission path in any other direction than directions of the first vibration transmission path L1 and the second vibration transmission path L2, centered around the conductive output portion.

According to the technical solutions in the embodiments of the present disclosure, when the first vibration assembly is activated, the conductive output portion, as a vibration energy source, transmits energy to a plurality of directions simultaneously: A high-intensity vibration is output to the second massage body along the second vibration transmission path L2 (the vibration excitation path), a weak vibration is output to the first massage body along the first vibration transmission path L1 (the vibration damping path), and vibrations in other directions diffuse through the third vibration transmission path L3. Since the third vibration transmission path L3 is included in a scope of vibration damping path design, the vibration energy in the first vibration transmission path L1 and the third vibration transmission path L3 is effectively weakened. Finally, a vibration intensity is sufficiently retained only along the second vibration transmission path L2, and vibrations in other directions (including the direction of the third vibration transmission path L3) are controlled at a low amplitude. Through the vibration damping design covering all non-essential directions, the massage device provided by the present disclosure solves the problem of undifferentiated vibration diffusion of traditional devices, and improves a utilization rate of vibration energy. More energy is concentrated on the second massage body, which reduces ineffective energy dissipation in air, a device housing, and other non-target areas; vibration damping of the third vibration transmission path effectively reduces the noise during operation of the massage device, and reduces noise of component friction or resonance caused by vibration; and impacts of vibrations in non-essential directions on the stability of the massage device are reduced, e.g., a slight displacement of the conductive output portion caused by the vibration in any non-essential direction is prevented, and long-term stability of a fixing effect of the second connection portion.

In some embodiments, the conductive output portion is provided with an embedded rib; and the embedded rib extends in the direction of the vibration excitation path and is embedded into the second massage body.

According to the technical solutions in the embodiments of the present disclosure, when the first vibration assembly is activated, the vibration energy is transmitted to the embedded rib through the conductive output portion, and since the embedded rib is combined with the second massage body in an embedded manner, the vibration energy may be directly diffused into the second massage body through an overall structure of the embedded rib. The embedded rib transmits originally dispersed vibration energy along the vibration excitation path in a concentrated manner, which reduces energy dissipation at a contact interface. Additionally, a rigid structure of the embedded rib complements an elastic material of the second massage body, and the embedded rib ensures efficient vibration transmission, while the elasticity of the second massage body enables to uniformly disperse the vibration to the entire second massage area. In the massage device provided by the present disclosure, directional extension of the embedded rib along the vibration excitation path ensures more precise transmission of vibration energy, and solves the problem of easy lateral vibration divergence in traditional planar contact; the embedded connection significantly enhances a bonding strength between the conductive output portion and the second massage body, prevents contact loosening caused by long-term vibration, and ensures stability of energy transmission efficiency; and the structure of the embedded rib enhances an energy density of the vibration excitation path, such that an intensity of vibration received by the second massage body is more concentrated, and a massage effect on the second massage area is more noticeable.

In some embodiments, an embodiment of the vibration damping path includes an air gap formed between the first massage body and the conductive output portion.

According to the technical solutions in the embodiments of the present disclosure, after the first vibration assembly is activated, the vibration energy generated by the conductive output portion is mainly transmitted to the second massage body along the vibration excitation path (the second vibration transmission path L2). When part of the vibration energy diffuses through the first vibration transmission path L1, contact with the air gap is first achieved. Since air is a poor conductor of vibration, the vibration energy significantly attenuates when passing through the air gap: When a high-frequency vibration propagates in the air medium, energy dissipates quickly due to molecular friction, and the energy cannot be effectively transmitted to the first massage body, thereby significantly reducing the vibration transmission to the first massage body. The air gap achieves efficient vibration damping through physical separation; compared with traditional rigid contact or flexible connection, the air gap weakens the energy of the first vibration transmission path L1 more directly, and prevents unnecessary vibration interference on the first massage area; the air gap is structurally simple, without need of an additional damping material or complex components, which simplifies the massage device structure and reduces production difficulty while ensuring the vibration damping effect; and the existence of the air gap reduces the direct friction between the conductive output portion and the first connection portion, and prevents component wear caused by the long-term vibration, thereby prolonging the service life of the massage device.

In some embodiments, a temperature control module is further arranged in the second massage body; and the temperature control module is configured to adjust a temperature during massage.

According to the technical solutions in the embodiments of the present disclosure, the user may adjust a temperature level according to needs; for example, the user may select a warming mode in a cold environment, and the temperature control module transmits appropriate heat to the second massage area through the second massage body to promote local blood circulation; and the user may select a normal temperature mode or a mild cooling mode when needing soothing and relaxation, which prevents discomfort caused by overheating. Throughout this process, the operation of the temperature control module does not interfere with the vibration transmission through the vibration excitation path, and the vibration energy and temperature synergistically act on the second massage area. The massage device provided by the present disclosure provides composite care combining vibrational and thermal effects on the second massage area through temperature adjustment, and enhances the comfort and healthcare effect of massage; the embedded design of the temperature control module in the second massage body achieves the short and direct transmission of heat energy/cold energy, prevents energy dissipation, and increases an adjustment response speed; and the synergistic effects of temperature and vibration better adapt to the needs of different use scenarios, thereby enhancing the versatility and user adaptability of the massage device.

In some embodiments, the massage device further includes a tapping assembly; the tapping assembly generates a tapping force via mechanical actuation; and the tapping assembly is configured to tap the second massage body to cause deformation so as to apply a massage force to the second massage area.

According to the technical solutions in the embodiments of the present disclosure, after the second massage body wraps the second massage area, the tapping assembly generates a periodic tapping force through the built-in mechanical drive structure, and an acting end thereof rhythmically taps the second massage body; and since the second massage body has an elastic thin-shell structure, local deformation occurs after tapping, and this deformation directly acts on the internal second massage area through elastic transmission, thereby forming a dynamic massage effect similar to light tapping and pressing. A tapping frequency and intensity may be adjusted according to needs, and for example, low-speed tapping is suitable for soothing and relaxation, and high-speed tapping may enhance local stimulation. Throughout this process, the massage cavity of the first massage body maintains stable support for the first massage area, and an acting force of the tapping assembly is transmitted only through the second massage body, without impact on a massage state of the first massage area. The tapping assembly provides dynamic tapping massage for the second massage area, which enriches massage methods; a synergistic interaction between the elastic thin-shell structure and the tapping force, and the elastic deformation of the thin-shell structure that buffers the tapping force, prevent discomfort caused by rigid tapping, and additionally, the tapping force is uniformly transmitted to the second massage area; and the independent arrangement of the tapping assembly ensures that the second massage area receives targeted mechanical stimulation, which functionally complements the massage of the first massage area, and enhances an overall massage effect of the massage device.

In some embodiments, a raised reinforcement portion is arranged on the surface of the second massage body in contact with the second massage area; and a position of the reinforcement portion corresponds to an acting point where the tapping assembly taps the second massage body.

According to the technical solutions in the embodiments of the present disclosure, when the tapping assembly taps the second massage body, the local deformation of the elastic thin-shell structure acts on the reinforcement portion on the inner surface thereof in a concentrated manner, such that the reinforcement portion causes more obvious convex compression on the second massage area. Since the reinforcement portion has a convex structure, when the tapping force is transmitted thereto through the thin-shell structure, a point-enhanced massage effect is formed: Compared with a surrounding planar area, the reinforcement portion transmits the tapping force to a corresponding area of the second massage area in a more concentrated manner, and the convex structure increases a local contact pressure, and achieves more targeted massage stimulation. Throughout the process, the reinforcement portion moves synchronously with the elastic deformation of the second massage body, which not only retains cushioning properties of the thin-shell structure, but also amplifies the effective effect of the tapping force through structural design. The massage device provided by the present disclosure solves the problem that the tapping force easily disperses during transmission through the elastic thin-shell structure, achieves the local concentration of tapping energy through the convex structure of the reinforcement portion, and enhances a perception intensity of the second massage area; the corresponding design of the reinforcement portion and the tapping acting point ensures that each tapping precisely acts on a target area, thereby preventing invalid force diffusion and improving massage efficiency; and the raised reinforcement portion increases the morphological change of a massage contact surface, such that the second massage area is simultaneously subjected to the composite stimulation by dynamic tapping and local convex compression, thereby enhancing the multi-layered sensation of massage.

In some embodiments, a guide groove is formed on an inner wall of the second massage body; an output end of the tapping assembly extends into the second massage body and the guide groove; and the reinforcement portion is arranged directly opposite to the guide groove.

In some embodiments, the surface of the second massage body in contact with the second massage area is provided with a texture structure configured to enhance the massage effect.

According to the technical solutions in the embodiments of the present disclosure, when the second massage body works, the texture structure enhances the massage effect in two ways: First, friction on the contact surface is increased, which reduces the relative displacement between the second massage body and the second massage area, ensures that the massage force is transmitted more accurately, and prevents effect attenuation caused by sliding; and second, the texture structure offers subtle mechanical stimulation on the skin through a concave-convex design, where such stimulation may activate a skin receptor, enhance neural feedback, enable the user to perceive the massage effect more obviously, and promote local blood circulation.

In some embodiments, the first massage body includes an integrally formed elastic silicone sleeve, a cup body, and a driving mechanism; the massage cavity is formed in the elastic silicone sleeve, and the inlet extends to a surface of the elastic silicone sleeve; the cup body encloses an outer surface of the elastic silicone sleeve, and the cup body is provided with an opening; and the driving mechanism is configured to act on the elastic silicone sleeve and drive same to perform a massage action. An inlet of the silicone sleeve extends out of the opening.

In some embodiments, the driving mechanism is configured to drive an inner wall of the massage cavity to vibrate and/or drive the massage cavity to contract and deform periodically.

In some embodiments, the second massage body has a semi-circular sheet-like structure; a straight edge of the second massage body is connected to half of a circular opening along an edge of the opening of the cup body through the first connection portion; and after connection, and the straight edge forms a curvature matched with the opening, such that both ends of a circular arc edge of the second massage body naturally tilt upward to form a wrapping curved surface.

In some embodiments, a plurality of massage heads are arranged on a surface of the second massage body in contact with the second massage area; the massage heads have a flexible sheet-like structure; and the massage heads perform swinging massage in response to vibration energy of the conductive output portion.

In some embodiments, physical parameters of the plurality of the massage heads are gradient-distributed in an arrangement direction; the physical parameters include at least one of hardness, size, and mass; and the physical parameters gradient-distributed enable each of the massage heads to have a differentiated resonance frequency.

In some embodiments, the first vibration assembly is configured to output a first frequency mode, and the first frequency mode excites resonance swinging of a single massage head among the plurality of the massage heads.

In some embodiments, the first vibration assembly is configured to output a second frequency mode, and the second frequency mode simultaneously excites composite resonance swinging of at least two of the massage heads.

In some embodiments, the second massage body includes a first segment close to the first connection portion and a second segment away from the first connection portion; and a thickness of the first segment gradually decreases from one end close to the first connection portion to one end close to the second segment, such that an inclined surface is formed; and the inclined surface is configured to come into contact with the second massage area.

In some embodiments, a plurality of the massage heads are arranged in columns on the inclined surface; and center lines of each column of the massage heads are parallel to an inclined direction of the inclined surface.

Additional aspects and advantages of the present disclosure will be set forth partially in the following description, which will become obvious in the following description, or may be learned by practice of the present disclosure.

BRIEF DESCRIPTION OF THE DRAWINGS

To describe the technical solution in the embodiments of the present disclosure more clearly, the accompanying drawings required for describing the embodiments are briefly described below. It is to be understood that the following accompanying drawings show merely some embodiments of the present disclosure, and therefore it is not to be construed as a limitation to the scope. Those of ordinary skill in the art can also derive other accompanying drawings from these accompanying drawings without making inventive efforts.

Figure 1:
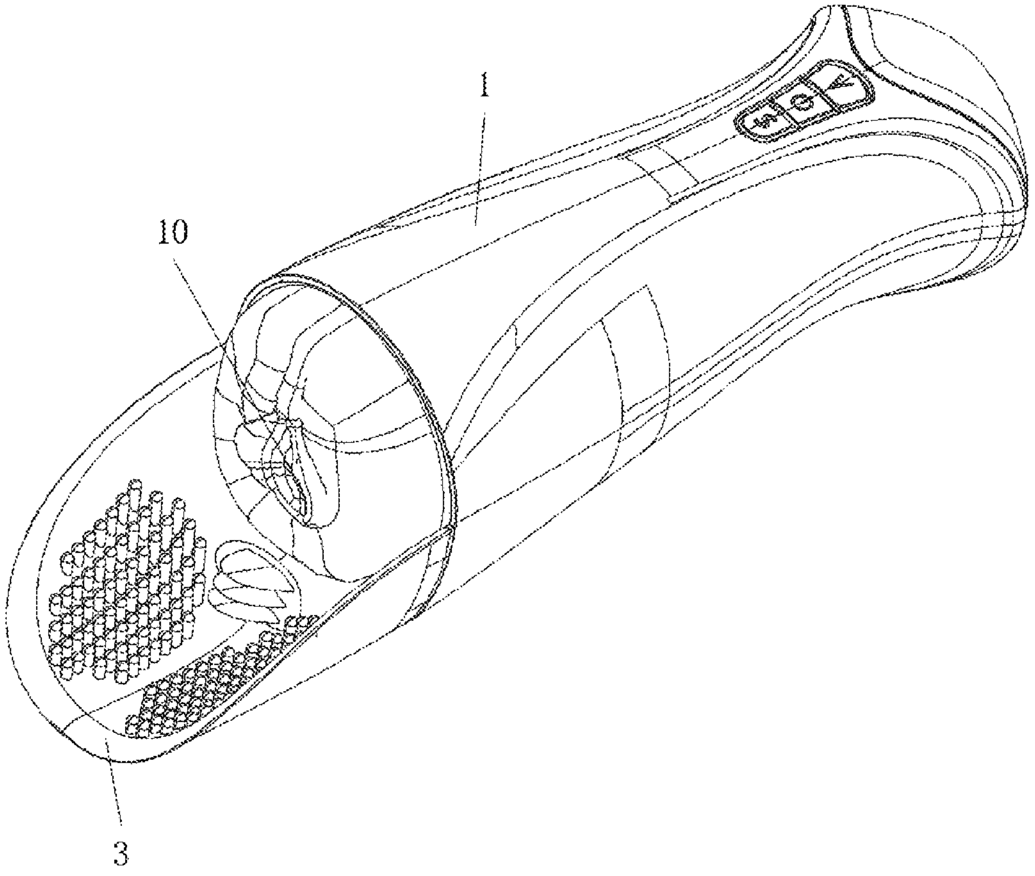
FIG. 1 is a schematic structural diagram of a massage device provided in some embodiments of the present disclosure.

Reference numerals in the figures: 1—first massage body; 10—inlet; 11—massage cavity; 12—first connection portion; 13—elastic silicone sleeve; 14—cup body; 3—second massage body; 30—second connection portion; 31—reinforcement portion; 32—massage head; 33—guide groove; 34—first segment; 35—second segment; 4—conductive output portion; 40—embedded rib; 5—temperature control module; and 6—tapping assembly.

DETAILED DESCRIPTIONS OF THE EMBODIMENTS

In order to make the objectives, technical solutions and advantages of the embodiments of the present disclosure clearer, the technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments acquired by those of ordinary skill in the art without making creative efforts fall within the scope of protection of the present disclosure.

Unless defined otherwise, all technical and scientific terms used herein have the same meanings as commonly understood by those skilled in the art to which the present disclosure belongs. The terms used in the specification of the present disclosure are for the purpose of describing specific embodiments merely and are not intended to limit the present disclosure. The terms "including" and "having", and any variations thereof in the specification, the claims and the above accompanying drawings are intended to cover non-exclusive inclusion. The terms "first", "second" and the like in the specification and the claims or the above accompanying drawings are used to distinguish different objects and are not intended to indicate a specific order or hierarchical relationship.

When the term "example" is referred to herein, it means that specific features, structures or characteristics described in combination with the example are included in at least one example of the present disclosure. When this phrase occurs at various positions in the specification, it neither necessarily refers to the same embodiment, nor refers to an independent or alternative embodiment mutually exclusive to other embodiments. Those skilled in the art understand both explicitly and implicitly that the embodiments described herein can be combined with other embodiments.

In the description of the present disclosure, it is to be noted that, unless otherwise explicitly specified and defined, the terms "mounting", "connected", "connecting" and "attaching" are to be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present disclosure may be understood according to specific circumstances.

The term "and/or" in the present disclosure, which is merely an association relation describing an associated object, means that there maybe exist three relations, for example, A and/or B maybe represent three situations: A exists alone, A and B exist at the same time, and B exists alone. In addition, the character "/" mentioned in the present disclosure generally indicates that the associated objects are in an "or" relationship.

The term "a plurality of" used in the present disclosure refers to two or more (including two), and similarly, "a plurality of groups" refers to two or more groups (including two groups), and "a plurality of sheets" refers to two or more sheets (including two sheets).

According to some embodiments of the present disclosure, optionally, as shown in FIGS. 1 to 8, the present disclosure provides a massage device, and the massage device includes a second massage body 3 and a first massage body 1 with an inlet 10, where the first massage body 1 is provided with a massage cavity 11, the inlet 10 is communicated with the massage cavity 11, and the massage cavity 11 is configured to massage a first massage area; the second massage body 3 is connected to the first massage body 1 through a first connection portion 12, and the first connection portion 12 is located at a position of the first massage body 1 adjacent to the inlet 10; and the second massage body 3 has an elastic thin-shell shape, wraps and elastically compresses a second massage area, and the first massage area and the second massage area belong to different regions of a human body.

The first massage area mentioned in the present disclosure may include, but is not limited to, a penis of a user, and the second massage area mentioned in the present disclosure may be, but is not limited to, a scrotum of the user, that is, the massage device provided by the present disclosure simultaneously massages the penis extending into the massage cavity 11 and the scrotum remaining near the inlet 10.

Since the massage cavity 11 is made of a relatively soft and elastic material, and the inlet 10 mentioned in the present disclosure may be, but is not limited to, a slit in shape.

Figure 8:
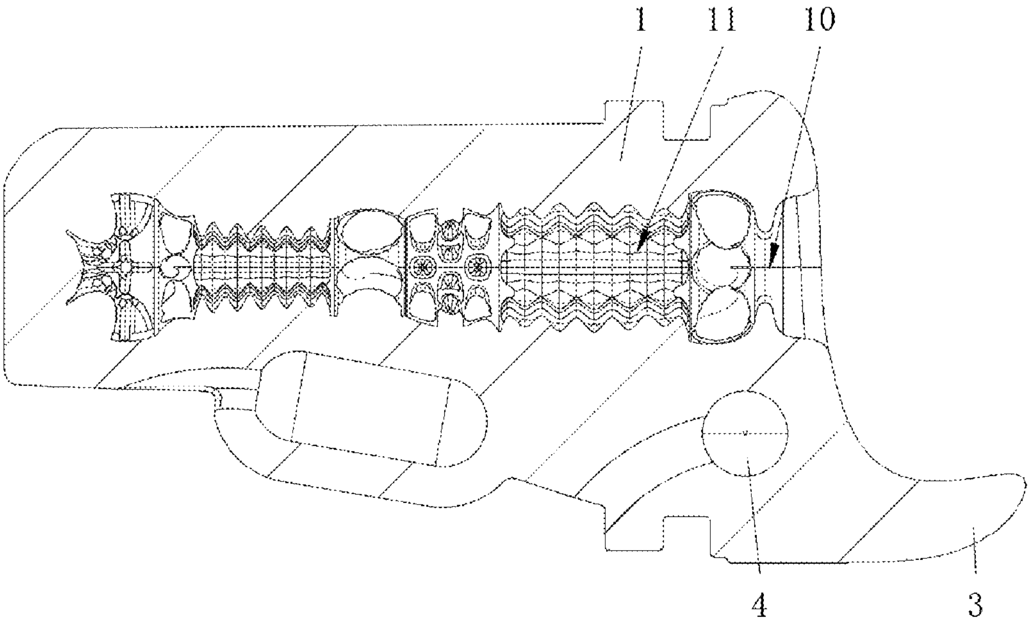
FIG. 8 is a sectional view of the massage device in FIG. 7.

As shown in FIG. 8, the first massage body 1 and the second massage body 3 mentioned in the present disclosure may be integrally formed, and the first connection portion 12 is a transition portion between the first massage body 1 and the second massage body 3.

Alternatively, the first massage body 1 and the second massage body 3 mentioned in the present disclosure may be separately arranged, and the first connection portion 12 is a connector between the first massage body 1 and the second massage body 3.

An elastic thin-shell structure mentioned in the present disclosure has both flexibility and supportiveness, and an elastic thin-shell structure deforms along a surface of the second massage area to fit therewith when coming into contact with the second massage area, and maintains an original shape without deformation when not coming into contact with the second massage area.

The second massage body 3 mentioned in the present disclosure wraps the second massage area but the second massage body 3 is not tightly enclosed, that is, the second massage body 3 only abuts against the second massage area.

The first connection portion 12 is located at the position of the first massage body 1 adjacent to the inlet 10, and this design ensures that the second massage body 3 fits a physiological position of the second massage area, reduces interference between the two massage bodies, and ensures that their respective massage functions are exerted independently and synergistically.

In practical applications, the user first aligns the first massage area with the inlet 10 of the first massage body 1, such that the first massage area naturally enters the massage cavity 11 communicated with the inlet 10, and in this case, the massage cavity 11 fits a contour of the first massage area to achieve targeted wrapping. Since the first connection portion 12 is located at the position of the first massage body 1 adjacent to the inlet 10, the second massage body 3 is stably connected to the first massage body 1 through the first connection portion 12, such that the position of the second massage body 3 is close to the inlet 10 of the first massage body 1, and the second massage area is wrapped in the elastic thin-shell shape. The massage cavity 11 of the first massage body 1 provides a contour-fitting support for the first massage area, which achieves a basic massage function through a cavity structure; and additionally, the second massage body 3 exerts uniform elastic compression on the second massage area by using its own elastic characteristics, and the flexible wrapping method adapts to differences in physiological characteristics of different users. The massage device provided by the present disclosure achieves collaborative care for the first massage area and the second massage area; the elastic thin-shell design of the second massage body 3 prevents compression discomfort caused by rigid contact and enhances contact comfort; and the position design of the first connection portion 12 ensures rational mechanical cooperation between the two massage bodies, enhances stability of the massage device during use, and prevents impairment to the massage effect caused by shaking, thereby fully leveraging the role of synergistic health-care for a plurality of massage areas.

Figure 4:
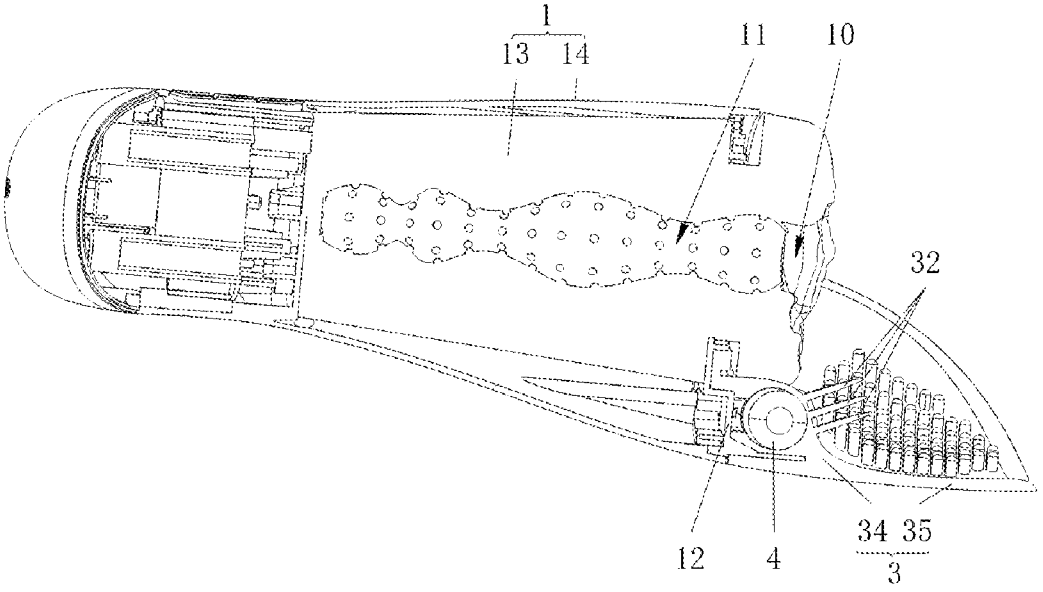
FIG. 4 is a sectional view of FIG. 3 in an A-A direction.
Figure 6:
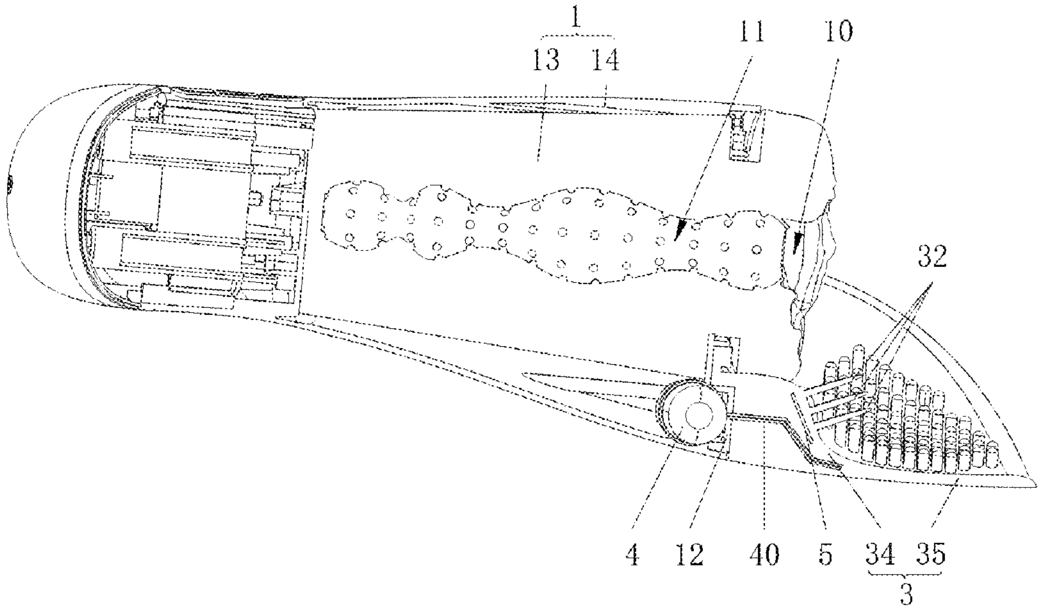
FIG. 6 is a sectional view of FIG. 3 in an A-A direction provided in some other embodiments of the present disclosure.
Figure 7:
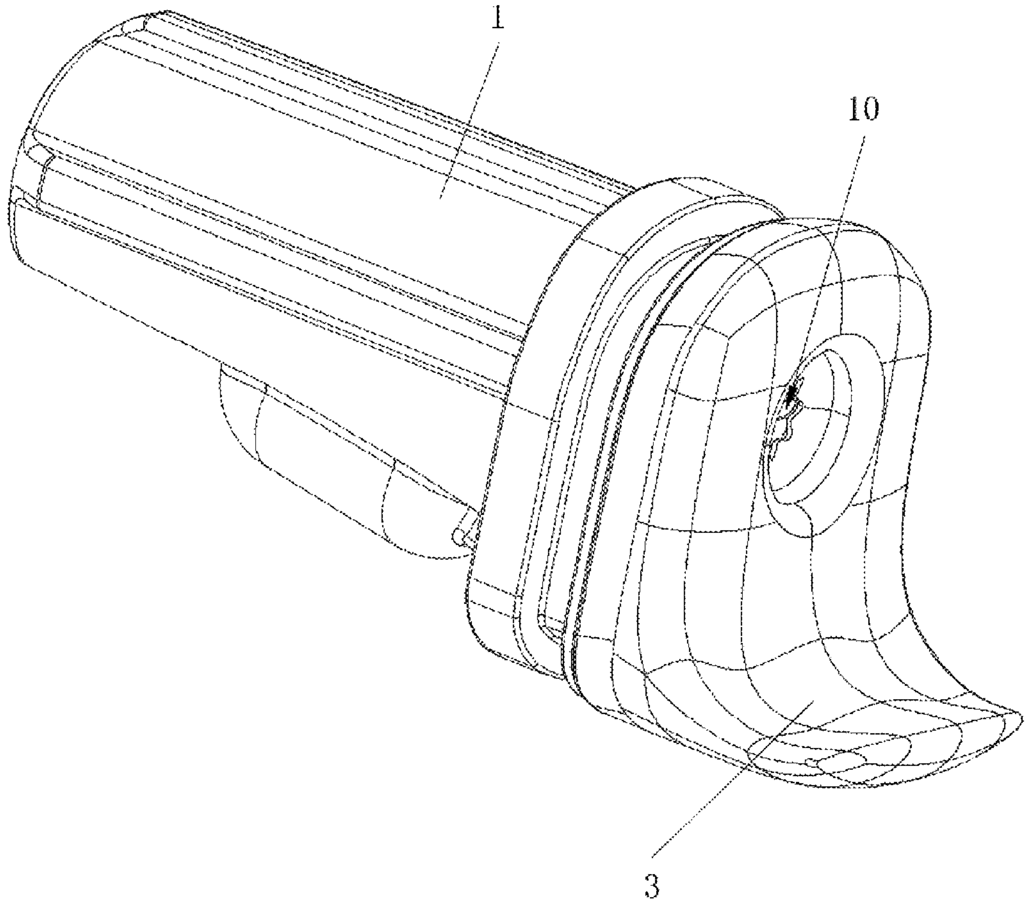
FIG. 7 is a side view of a massage device provided in some embodiments of the present disclosure.

In a specific embodiment, as shown in FIGS. 4 and 6, the first massage body 1 may include an elastic silicone sleeve 13, a cup body 14 configured to accommodate the elastic silicone sleeve 13, and a driving mechanism structure configured to drive the elastic silicone sleeve 13 to perform a massage action, where the inlet 10 of the elastic silicone sleeve 13 extends out of an opening of the cup body 14, the elastic silicone sleeve 13 wraps the first massage area, and a massage force is applied to the first massage area through the driving mechanism disposed on an inner side of the elastic silicone sleeve 13;

- the massage cavity 11 is communicated with the outside only through the inlet 10;
- the driving mechanism may be a vibration component, and the vibration component causes vibration of an inner wall of the massage cavity 11 to press or tap the first massage area; and
- alternatively, the driving mechanism drives the massage cavity 11 to contract and deform intermittently to squeeze the first massage area.

Figure 5:
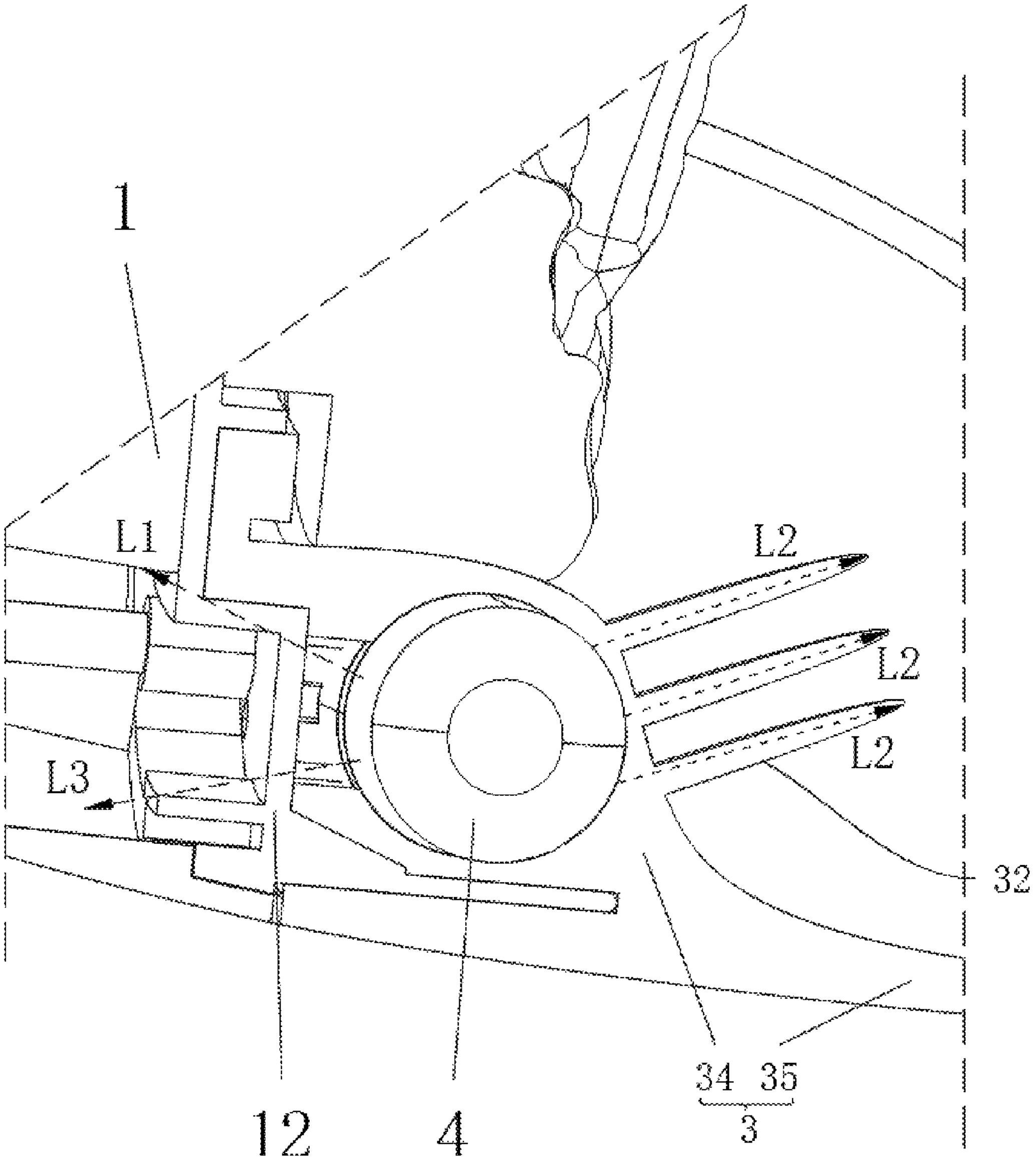
FIG. 5 is a partial enlarged view of FIG. 4.

According to some embodiments of the present disclosure, optionally, as shown in FIGS. 4 to 6, the massage device further includes a first vibration assembly provided with a conductive output portion 4, where the first vibration assembly is disposed on the first connection portion 12 or in an area adjacent to the first connection portion 12, and the conductive output portion 4 is located in the second massage body 3 and configured to output vibration energy to the second massage body 3.

The first vibration assembly is disposed on the first connection portion 12 or in an area adjacent to the first connection portion 12, such that not only the first vibration assembly is fixed by virtue of the structural strength of the first connection portion 12, but also the conductive output portion 4 naturally extends into the second massage body 3, which prevents damage to an elastic form of the second massage body 3 by an additional connection structure.

The conductive output portion 4 is located in the second massage body 3, which ensures that vibration energy directly acts on a massage carrier (the second massage body 3) instead of being transmitted through air or any other gap, thereby greatly enhancing energy transmission efficiency.

The vibration energy generated by the first vibration assembly is efficiently transmitted to the second massage body 3 through the conductive output portion 4. Since the conductive output portion 4 directly acts on an interior of the second massage body 3, the vibration energy is absorbed by the second massage body 3 almost without loss, which is converted into high-frequency flexible vibration massage for the second massage area. During use, the massage cavity 11 of the first massage body 1 continues to provide a massage effect on the first massage area, and elastic compression by the second massage body 3 superimposes a dynamic massage effect from the vibration energy.

The massage device provided by the present disclosure achieves targeted vibration massage on the second massage area through directional energy output of the conductive output portion 4, which solves the problems of traditional massage devices including vibration energy dispersion and inaccurate massage; the first vibration assembly is arranged close to the first connection portion 12, which shortens a vibration transmission path, reduces energy dissipation, and ensures a stable vibration intensity; and thirdly, a synergistic action of vibration massage and elastic compression achieves a better effect of blood circulation and muscle relaxation of the second massage area.

In a specific embodiment, as shown in FIG. 5, three massage heads 32 (a plurality of the massage heads 32 may be arranged, and the three massage heads are described in the present disclosure for illustrative purposes) are further arranged on a surface of the second massage body 3 in contact with the second massage area, where the massage heads 32 are leaf-shaped or tongue-shaped, and may swing under the guidance of the conductive output portion 4 to massage the second massage area.

The three massage heads 32 are arranged sequentially along the surface of the second massage body 3, and the hardness of the three massage heads 32 increases or decreases sequentially along an arrangement direction, such that the three massage heads have different vibration frequencies of the first vibration assembly respectively; for example, a first vibration frequency of the first vibration assembly causes the massage head 32 with the lowest hardness to resonate and swing to massage the second massage area; a second vibration frequency of the first vibration assembly causes the massage head 32 with moderate hardness to resonate and swing to massage the second massage area; and a third vibration frequency of the first vibration assembly causes the massage head 32 with the highest hardness to resonate and swing to massage the second massage area. For another example, the first vibration frequency of the first vibration assembly causes the massage head 32 with the lowest hardness to resonate and swing to massage the second massage area; the second vibration frequency of the first vibration assembly causes the massage head 32 with the lowest hardness and the massage head 32 with the moderate hardness to resonate and swing to massage the second massage area; and the third vibration frequency of the first vibration assembly causes the three massage heads 32 to resonate and swing to massage the second massage area.

Alternatively, dimensions of portions of the three massage heads 32 protruding from the second massage body 3 increase or decrease sequentially along the arrangement direction, such that the three massage heads have different vibration frequencies of the first vibration assembly respectively; for example, the first vibration frequency of the first vibration assembly causes the shortest massage head 32 to resonate and swing to massage the second massage area; the second vibration frequency of the first vibration assembly causes the medium-sized massage head 32 to resonate and swing to massage the second massage area; and the third vibration frequency of the first vibration assembly causes the longest massage head 32 to resonate and swing to massage the second massage area. For another example, the first vibration frequency of the first vibration assembly causes the shortest massage head 32 to resonate and swing to massage the second massage area; the second vibration frequency of the first vibration assembly causes the shortest and medium-sized massage head 32 to resonate and swing to massage the second massage area; and the third vibration frequency of the first vibration assembly causes the three massage head 32 to resonate and swing to massage the second massage area.

Figure 9:
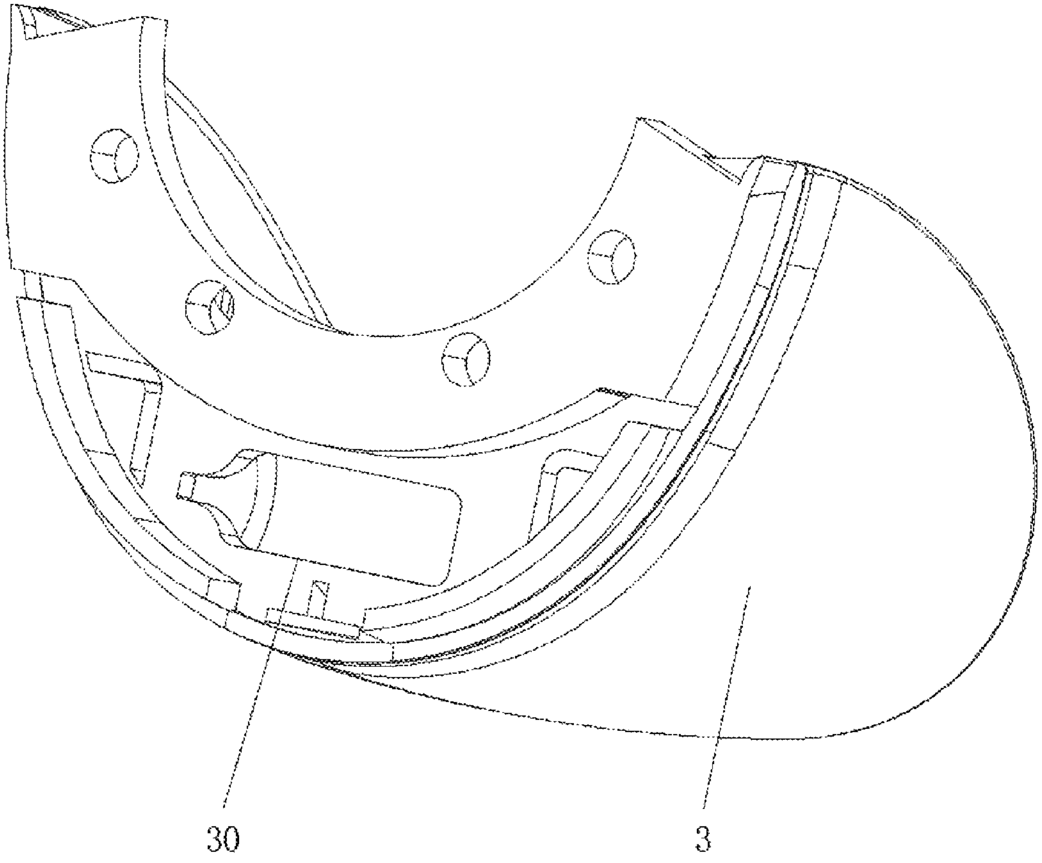
FIG. 9 is a schematic structural diagram of a second massage body provided in some embodiments of the present disclosure.

According to some embodiments of the present disclosure, optionally, as shown in FIG. 9, the massage device further includes a second connection portion 30; the second connection portion 30 is disposed in the second massage body 3 and arranged close to the first connection portion 12; the second connection portion 30 is configured to fix the conductive output portion 4; the conductive output portion 4 has both a vibration damping path and a vibration excitation path; the vibration damping path includes a first vibration transmission path L1 from the conductive output portion 4 to the first massage body 1, and the first vibration transmission path L1 is a direct vibration transmission path from the conductive output portion 4 to the first massage body 1; the vibration excitation path includes a second vibration transmission path L2 from the conductive output portion 4 to the second massage body 3, and the second vibration transmission path L2 is a direct vibration transmission path from the conductive output portion 4 to the second massage body 3; and a vibration intensity and/or energy transmitted by the conductive output portion 4 along the vibration damping path is less than a vibration intensity and/or energy transmitted along the vibration excitation path.

The vibration excitation path is a core path of the massage device for efficiently transmitting vibration energy to the second massage body 3, and the vibration excitation path starts from the conductive output portion 4 and ends at an inner side wall and overall structure of the second massage body 3. Since the conductive output portion 4 is located in the second massage body 3 and fixed at a position close to the first connection portion 12 through the second connection portion 30, and the conductive output portion 4 is in direct and close contact with an inner side of the second massage body 3, where this contact may be surface contact or multi-point contact, thereby ensuring that vibration energy is directly transmitted without need of passing through other non-essential structures. During energy transmission, vibration generated by the first vibration assembly directly acts on the second massage body 3 through the conductive output portion 4, and a short transmission path without an obvious energy barrier structure ensures minimal vibration intensity and energy dissipation.

The second vibration transmission path L2 is an only component of the vibration excitation path, and defined as the direct vibration transmission path from the conductive output portion 4 to the second massage body 3. The conductive output portion 4 is located in the second massage body 3 and fixed by the second connection portion 30, such that the conductive output portion is in stable contact with the inner side wall of the second massage body 3, and the transmission path is short without obvious energy barrier.

The vibration damping path is a path configured to weaken the vibration energy transmitted to the first massage body 1, and a core function thereof is to reduce the interference of vibration on the first massage body 1, where the energy transmission intensity and efficiency of the vibration damping path are deliberately reduced, thereby forming a significant difference from the vibration excitation path. The first vibration transmission path L1, as the main component of the vibration damping path, is a direct transmission channel from the conductive output portion 4 to the first massage body 1. However, unlike the vibration excitation path, this path may be structurally designed to weaken energy, or since the conductive output portion 4 is connected to but is not in rigid and close contact with the first massage body 1, significant attenuation of vibration occurs during energy transmission.

The first vibration transmission path L1 is a core component of the vibration damping path, and defined as a direct vibration transmission path from the conductive output portion 4 to the first massage body 1. This path starts from the conductive output portion 4 and ends at the first massage body 1, and a transmission medium may involve the first connection portion 12 or a connection structure between the conductive output portion and the first massage body.

In the vibration excitation path, the conductive output portion 4 directly outputs vibration energy to the second massage body 3 through the second vibration transmission path L2, and since the vibration excitation path is a direct vibration transmission path, energy dissipation is minimal, and the second massage body 3 efficiently receives vibration and converts the vibration into a dynamic massage force for the second massage area. In the vibration damping path, when the conductive output portion 4 transmits a vibration to the first massage body 1 through the first vibration transmission path L1, the energy is effectively weakened, such that an intensity of vibration received by the first massage body 1 is much lower than that of the second massage body 3. For the massage device provided by the present disclosure, a fixing effect of the second connection portion 30 ensures position stability of the conductive output portion 4, and prevents the decrease in energy transmission efficiency caused by component loosening during vibration; the differential design of the vibration damping path and the vibration excitation path achieves directional distribution of vibration energy, such that stronger vibration massage on the second massage area is achieved, and the vibration interference of the first massage body 1 is reduced, which solves the problem of functional redundancy caused by vibration diffusion of traditional devices; and the precise distribution of vibration energy improves an energy efficiency ratio of the massage device, and ensures that more energy is used for effective massage areas.

Figure 3:
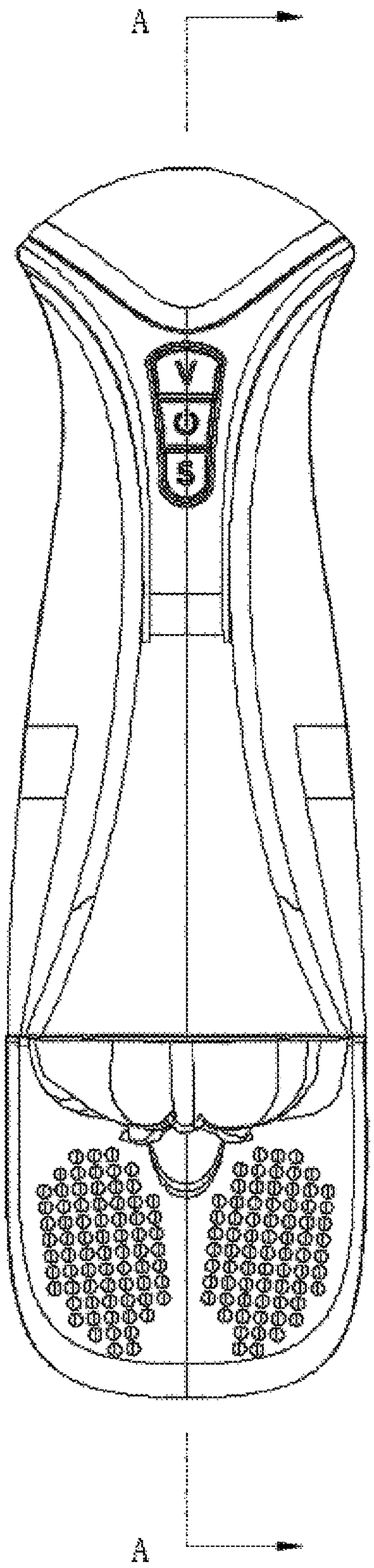
FIG. 3 is a top view of a massage device provided in some embodiments of the present disclosure.

According to some embodiments of the present disclosure, optionally, as shown in FIG. 3, the vibration damping path further includes a third vibration transmission path L3, where the third vibration transmission path L3 includes a vibration transmission path in any other direction than directions of the first vibration transmission path L1 and the second vibration transmission path L2, centered around the conductive output portion 4.

The third vibration transmission path L3 encompasses all directions other than the directions of the first vibration transmission path L1 and the second vibration transmission path L2, and no matter which non-target direction the vibration diffuses to, the vibration may be included in a vibration damping control range, thereby forming a dead-angle-free energy constraint.

When the first vibration assembly is activated, the conductive output portion 4, as a vibration energy source, transmits energy to a plurality of directions simultaneously: A high-intensity vibration is output to the second massage body 3 along the second vibration transmission path L2 (the vibration excitation path), a weak vibration is output to the first massage body 1 along the first vibration transmission path L1 (the vibration damping path), and vibrations in other directions diffuse through the third vibration transmission path L3. Since the third vibration transmission path L3 is included in a scope of vibration damping path design, the vibration energy in the first vibration transmission path L1 and the third vibration transmission path L3 is effectively weakened. Finally, a vibration intensity is sufficiently retained only along the second vibration transmission path L2, and vibrations in other directions (including the direction of the third vibration transmission path L3) are controlled at a low amplitude.

Through the vibration damping design covering all non-essential directions, the massage device provided by the present disclosure solves the problem of undifferentiated vibration diffusion of traditional devices, and improves a utilization rate of vibration energy. More energy is concentrated on the second massage body 3, which reduces ineffective energy dissipation in air, a device housing, and other non-target areas; vibration damping of the third vibration transmission path L3 effectively reduces the noise during operation of the massage device, and reduces noise of component friction or resonance caused by vibration; and impacts of vibrations in non-essential directions on the stability of the massage device are reduced, e.g., a slight displacement of the conductive output portion 4 caused by the vibration in any non-essential direction is prevented, and long-term stability of a fixing effect of the second connection portion 30.

Figure 10:
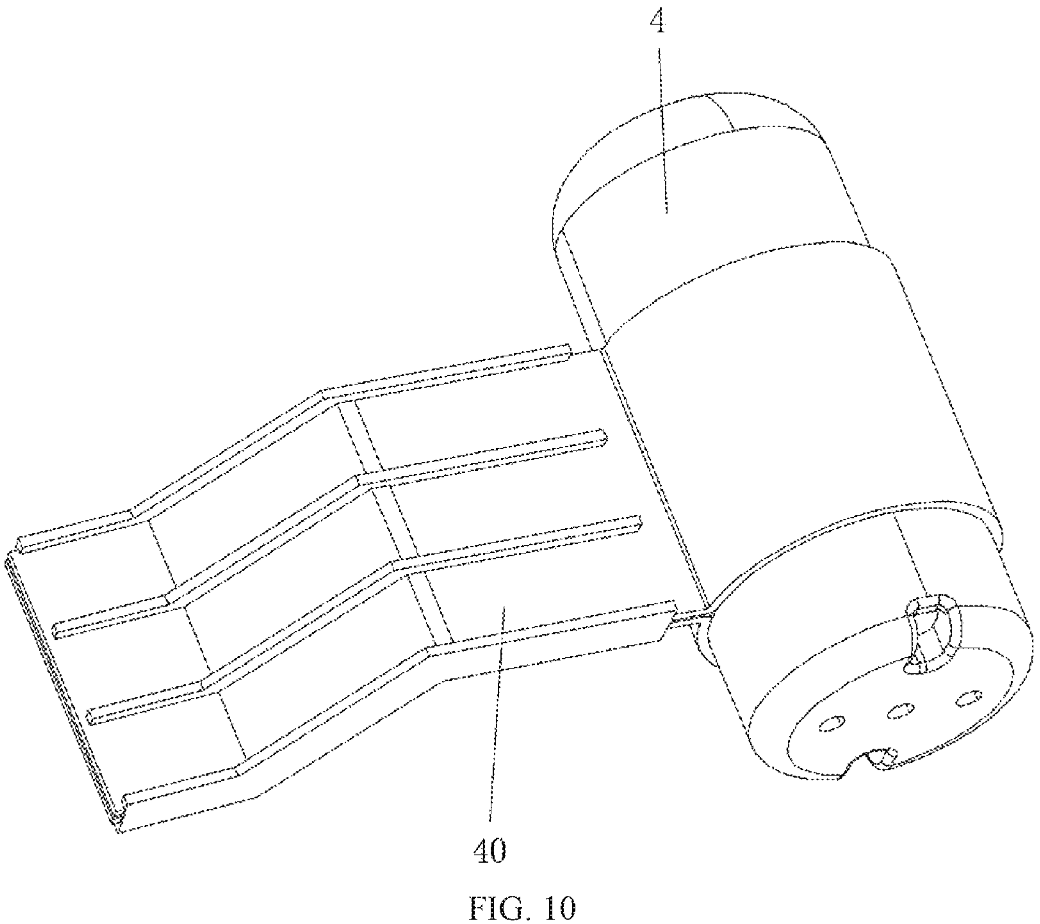
FIG. 10 is a schematic structural diagram of a conductive output portion provided in some examples of the present disclosure.

According to some embodiments of the present disclosure, optionally, as shown in FIGS. 9 and 10, the conductive output portion 4 is provided with an embedded rib 40; and the embedded rib 40 extends in the direction of the vibration excitation path and is embedded into the second massage body 3.

A plurality of the embedded ribs 40 may be arranged in parallel or the embedded rib 40 may have a branched structure (in the direction of the vibration excitation path), such that vibration energy diffuses to the second massage body 3 through a plurality of channels, thereby preventing uneven vibration concentration caused by a single contact point, and ensuring a more uniform force application on the second massage area.

The embedded rib 40, as an extension structure of the conductive output portion 4, is embedded into the elastic thin-shell structure of the second massage body 3 in the direction of the vibration excitation path (i.e., the second vibration transmission path L2). For example, when the vibration excitation path extends from the conductive output portion 4 to a middle area of the second massage body 3, the embedded rib 40 is embedded into the shell in this direction and forms an anchored connection with the inner side wall of the second massage body 3.

When the first vibration assembly is activated, the vibration energy is transmitted to the embedded rib 40 through the conductive output portion 4, and since the embedded rib 40 is combined with the second massage body 3 in an embedded manner, the vibration energy may be directly diffused into the second massage body 3 through an overall structure of the embedded rib 40. The embedded rib 40 transmits originally dispersed vibration energy along the vibration excitation path in a concentrated manner, which reduces energy dissipation at a contact interface. Additionally, a rigid structure of the embedded rib 40 complements an elastic material of the second massage body 3, and the embedded rib 40 ensures efficient vibration transmission, while the elasticity of the second massage body 3 enables to uniformly disperse the vibration to the entire second massage area.

In the massage device provided by the present disclosure, directional extension of the embedded rib 40 along the vibration excitation path ensures more precise transmission of vibration energy, and solves the problem of easy lateral vibration divergence in traditional planar contact; the embedded connection significantly enhances a bonding strength between the conductive output portion 4 and the second massage body 3, prevents contact loosening caused by long-term vibration, and ensures stability of energy transmission efficiency; and the structure of the embedded rib 40 enhances an energy density of the vibration excitation path, such that an intensity of vibration received by the second massage body 3 is more concentrated, and a massage effect on the second massage area is more noticeable.

According to some embodiments of the present disclosure, optionally, an embodiment of the vibration damping path includes an air gap formed between the first massage body 1 and the conductive output portion 4.

Vibration energy is transmitted efficiently in solids, but attenuates rapidly due to energy dispersion in loose media such as air, and this physical characteristic causes the air gap to be a natural vibration damping barrier.

After the first vibration assembly is activated, the vibration energy generated by the conductive output portion 4 is mainly transmitted to the second massage body 3 along the vibration excitation path (the second vibration transmission path L2). When part of the vibration energy diffuses through the first vibration transmission path L1, contact with the air gap is first achieved. Since air is a poor conductor of vibration, the vibration energy significantly attenuates when passing through the air gap: When a high-frequency vibration propagates in the air medium, energy dissipates quickly due to molecular friction, and the energy cannot be effectively transmitted to the first massage body 1, thereby significantly reducing the vibration transmission to the first massage body 1. The air gap achieves efficient vibration damping through physical separation; compared with traditional rigid contact or flexible connection, the air gap weakens the energy of the first vibration transmission path L1 more directly, and prevents unnecessary vibration interference on the first massage area; the air gap is structurally simple, without need of an additional damping material or complex components, which simplifies the massage device structure and reduces production difficulty while ensuring the vibration damping effect; and the existence of the air gap reduces the direct friction between the conductive output portion 4 and the first connection portion 12, and prevents component wear caused by the long-term vibration, thereby prolonging the service life of the massage device.

According to some embodiments of the present disclosure, optionally, as shown in FIG. 6, a temperature control module 5 is further arranged in the second massage body 3; and the temperature control module 5 is configured to adjust a temperature during massage.

The temperature control module 5 is independent of the first vibration assembly in operation, without structural interference therebetween, which ensures full play of respective roles of vibration energy transmission and temperature adjustment, and achieves function superposition.

After the user activates the massage device provided by the present disclosure, the temperature control module 5 starts working synchronously. Since the temperature control module 5 is located in the second massage body 3, the heat energy or cold energy generated may be directly transmitted to the second massage area through the second massage body 3.

The user may adjust a temperature level according to needs; for example, the user may select a warming mode in a cold environment, and the temperature control module 5 transmits appropriate heat to the second massage area through the second massage body 3 to promote local blood circulation; and the user may select a normal temperature mode or a mild cooling mode when needing soothing and relaxation, which prevents discomfort caused by overheating. Throughout this process, the operation of the temperature control module 5 does not interfere with the vibration transmission through the vibration excitation path, and the vibration energy and temperature synergistically act on the second massage area. The massage device provided by the present disclosure provides composite care combining vibrational and thermal effects on the second massage area through temperature adjustment, and enhances the comfort and healthcare effect of massage; the embedded design of the temperature control module 5 in the second massage body 3 achieves the short and direct transmission of heat energy/cold energy, prevents energy dissipation, and increases an adjustment response speed; and the synergistic effects of temperature and vibration better adapt to the needs of different use scenarios, thereby enhancing the versatility and user adaptability of the massage device.

Figure 11:
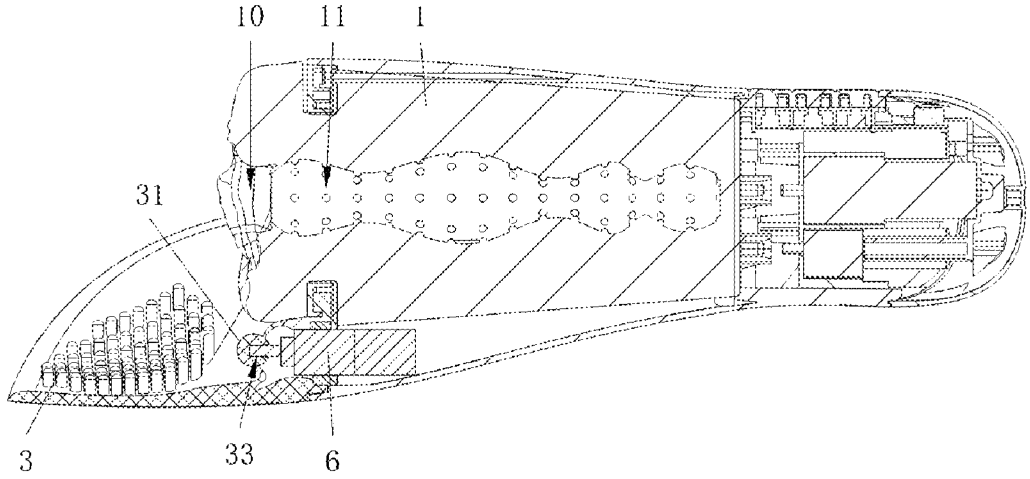
FIG. 11 is a sectional view of a massage device provided in some embodiments of the present disclosure.

According to some embodiments of the present disclosure, optionally, as shown in FIG. 11, the massage device further includes a tapping assembly 6; the tapping assembly 6 generates a tapping force via mechanical actuation; and the tapping assembly 6 is configured to tap against the second massage body 3 to cause deformation so as to apply a massage force to the second massage area.

A mechanical drive structure of the tapping assembly 6 may be compactly integrated with the overall structure of the massage device, and for example, the mechanical drive structure is installed near the first connection portion 12 or in an edge area of the second massage body 3, without occupying too much additional space, thereby maintaining the portability and wearing comfort of the massage device.

A magnitude of a tapping force of the tapping assembly 6 is designed to match a deformation capacity of the second massage body 3, such that the second massage body 3 is not excessively deformed due to an excessive force, and lack of an effective massage effect due to application of an insufficient force is prevented.

After the second massage body 3 wraps the second massage area, the tapping assembly 6 generates a periodic tapping force through the built-in mechanical drive structure, and an acting end thereof rhythmically taps the second massage body 3; and since the second massage body 3 has an elastic thin-shell structure, local deformation occurs after tapping, and this deformation directly acts on the internal second massage area through elastic transmission, thereby forming a dynamic massage effect similar to light tapping and pressing. A tapping frequency and intensity may be adjusted according to needs, and for example, low-speed tapping is suitable for soothing and relaxation, and high-speed tapping may enhance local stimulation. Throughout this process, the massage cavity 11 of the first massage body 1 maintains stable support for the first massage area, and an acting force of the tapping assembly 6 is transmitted only through the second massage body 3, without impact on a massage state of the first massage area.

The tapping assembly 6 provides dynamic tapping massage for the second massage area, which enriches massage methods; a synergistic interaction between the elastic thin-shell structure and the tapping force, and the elastic deformation of the thin-shell structure that buffers the tapping force, prevent discomfort caused by rigid tapping, and additionally, the tapping force is uniformly transmitted to the second massage area; and the independent arrangement of the tapping assembly 6 ensures that the second massage area receives targeted mechanical stimulation, which functionally complements the massage of the first massage area, and enhances an overall massage effect of the massage device.

In a specific implementation process, the built-in mechanical drive structure of the tapping assembly may be a telescopic motor, and an output end thereof extends and retracts to tap the second massage body; and alternatively, the built-in mechanical drive structure of the tapping assembly may be a rotating block connected to a rotating motor, and the rotating block rotates to tap the second massage body.

According to some embodiments of the present disclosure, optionally, as shown in FIG. 11, a raised reinforcement portion 31 is arranged on the surface of the second massage body 3 in contact with the second massage area; and a position of the reinforcement portion 31 corresponds to an acting point where the tapping assembly 6 taps the second massage body 3.

The hardness of the reinforcement portion 31 may be higher than the hardness of other areas of the second massage body 3.

After the tapping assembly 6 is activated, an acting end of the tapping assembly 6 taps the second massage body 3 at a preset frequency, and the reinforcement portion 31 on an inner surface of the second massage body 3 is exactly located at a position corresponding to a tapping acting point, i.e., a position where the tapping force is transmitted to the second massage body 3, where an inner side thereof corresponds to the raised reinforcement portion 31.

When the tapping assembly 6 taps the second massage body 3, the local deformation of the elastic thin-shell structure acts on the reinforcement portion 31 on the inner surface of the second massage body 3 in a concentrated manner, such that the reinforcement portion 31 causes more obvious convex compression on the second massage area. Since the reinforcement portion 31 has a convex structure, when the tapping force is transmitted thereto through the thin-shell structure, a point-enhanced massage effect is formed: Compared with a surrounding planar area, the reinforcement portion 31 transmits the tapping force to a corresponding area of the second massage area in a more concentrated manner, and the convex structure increases a local contact pressure, and achieves more targeted massage stimulation. Throughout the process, the reinforcement portion 31 moves synchronously with the elastic deformation of the second massage body 3, which not only retains cushioning properties of the thin-shell structure, but also amplifies the effective effect of the tapping force through structural design.

The massage device provided by the present disclosure solves the problem that the tapping force easily disperses during transmission through the elastic thin-shell structure, achieves the local concentration of tapping energy through the convex structure of the reinforcement portion 31, and enhances a perception intensity of the second massage area; the corresponding design of the reinforcement portion 31 and the tapping acting point ensures that each tapping precisely acts on a target area, thereby preventing invalid force diffusion and improving massage efficiency; and the raised reinforcement portion 31 increases the morphological change of a massage contact surface, such that the second massage area is simultaneously subjected to the composite stimulation by dynamic tapping and local convex compression, thereby enhancing the multi-layered sensation of massage.

According to some embodiments of the present disclosure, optionally, as shown in FIG. 11, a guide groove 33 is formed on an inner wall of the second massage body 3; an output end of the tapping assembly 6 extends into the second massage body 3 and the guide groove 33; and the reinforcement portion 31 is arranged directly opposite to the guide groove 33.

The guide groove 33 of the second massage body 3 may be partially snap-fitted with the output end of the tapping assembly 6, such that the output end of the tapping assembly 6 pulls a corresponding portion of the second massage body 3 to move through the guide groove 33, and the corresponding portion of the second massage body 3 may engage with and disengage from the second massage area relatively quickly under the pulling action of the tapping assembly 6, thereby enhancing the tapping effect on the second massage area.

The tapping assembly 6 generates a tapping force via mechanical actuation (for example, a motor drives a cam), and the output end of the tapping assembly moves along the guide groove 33 on the inner wall of the second massage body 3, which enables to accurately tap the inner wall of the second massage body 3 directly opposite to the guide groove 33; and since the reinforcement portion 31 is directly opposite to the guide groove 33, the tapping force is directly transmitted to shoulder muscles through the reinforcement portion 31, which prevents deviation or dispersion of the tapping force.

Figure 2:
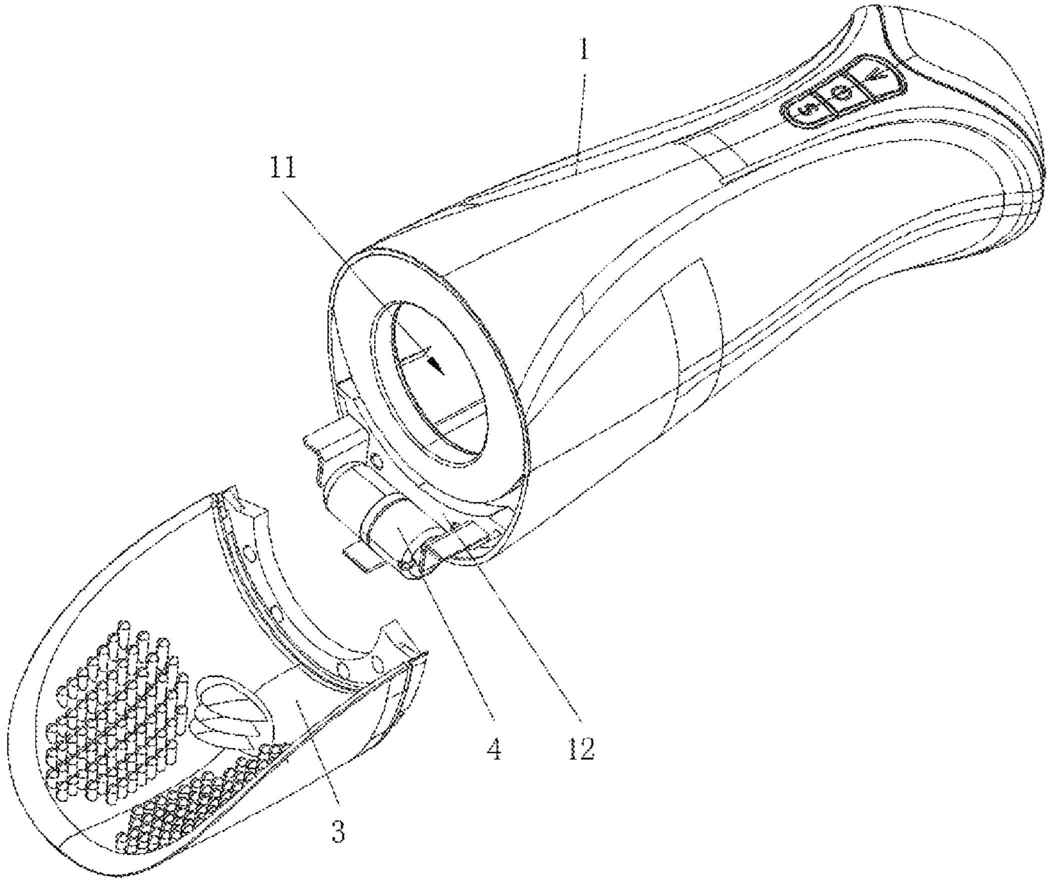
FIG. 2 is an exploded view of a first massage body and a second massage body provided in some embodiments of the present disclosure.

According to some embodiments of the present disclosure, optionally, as shown in FIGS. 1 to 3, the surface of the second massage body 3 in contact with the second massage area is provided with a texture structure configured to enhance the massage effect.

When the second massage body 3 wraps the second massage area in the elastic thin-shell shape, the texture structure (such as fine striations, bump arrays, or wavy patterns) on an inner surface thereof is in close contact with the skin of the second massage area.

When the second massage body 3 works, the texture structure enhances the massage effect in two ways: First, friction on the contact surface is increased, which reduces the relative displacement between the second massage body 3 and the second massage area, ensures that the massage force is transmitted more accurately, and prevents effect attenuation caused by sliding; and second, the texture structure offers subtle mechanical stimulation on the skin through a concave-convex design, where such stimulation may activate a skin receptor, enhance neural feedback, enable the user to perceive the massage effect more obviously, and promote local blood circulation.

According to some embodiments of the present disclosure, optionally, as shown in FIG. 2, a straight edge of the second massage body 3 is connected to half of a circular opening along an edge of the opening of the cup body 14 through the first connection portion 12; and after connection, and the straight edge forms a curvature matched with the opening, such that both ends of a circular arc edge of the second massage body 3 naturally tilt upward to form a wrapping curved surface.

The opening of the cup body 14 is circular, when the straight edge of the second massage body 3 is connected to half of the circular opening along the edge of the opening of the cup body, the straight edge is bent by a circumferential radian of the opening, which drives both ends of the circular arc edge to tilt upward, such that a curved surface formed in this way more fits a physiological curve of the scrotum of the user, thereby enhancing the wrapping effect on the user's second massage area.

The wrapping curved surface of the second massage body 3 is naturally formed by matching the straight edge with the curvature of the opening of the cup body 14, instead of being achieved by a complex mold or an adjustable component, which reduces the number of components (without need of an additional angular adjustment clasp) and lowers the assembly difficulty.

In a specific implementation process, the first connection portion 12 may have a quick-release structure, and the user may replace the second massage body 3 of different sizes according to the size and shape of the second massage area, thereby preventing the situation of inadequate wrapping or not fitting.

According to some embodiments of the present disclosure, optionally, as shown in FIGS. 4 to 6, the second massage body 3 includes a first segment 34 close to the first connection portion 12 and a second segment 35 away from the first connection portion 12; and a thickness of the first segment 34 gradually decreases from one end close to the first connection portion 12 to one end close to the second segment 35, such that an inclined surface is formed; and the inclined surface is configured to come into contact with the second massage area.

The inclined surface of the first segment 34 is formed to match a surface shape of the second massage area; on the one hand, the second massage body 3 is fitted with the second massage area through the inclined surface in a more comprehensive and close manner; and on the other hand, a contact area between the second massage body 3 and the second massage area increases, such that vibration energy may be transmitted to the second massage area through more paths, thereby enhancing the user's massage experience.

According to some embodiments of the present disclosure, optionally, as shown in FIGS. 4 to 6, a plurality of the massage heads 32 are arranged in columns on the inclined surface; and center lines of each column of the massage heads 32 are parallel to an inclined direction of the inclined surface.

Lengths of the plurality of the massage heads 32 may gradually decrease from high to low to match the shape of the second massage area (i.e., the shape of the scrotum), and the longer massage heads 32 may extend into a recessed area of the second massage area for swinging massage, which increases the coverage of the massage effect and enhances the user's use experience.

The plurality of the massage heads 32 are arranged in columns and extend in the inclined direction, which achieves gapless coverage on the surface of the second massage area, and prevents the problem of local dense distribution and local vacancies of the massage heads 32; and additionally, swinging actions of each column of the massage heads 32 are synchronized, which forms a sensation of continuous combing along muscle lines, and the smoother user experience is achieved.

Each column of the massage heads 32 swings in a fixed direction, and a uniform spacing is formed between columns, which prevents collision or friction between the massage heads 32 during swinging, and reduces the problems of scrotal tissue compression and friction noise between the massage heads 32.

The present disclosure has been described with reference to preferred embodiments, but various modifications thereto may be made without departing from the scope of the present disclosure, and equivalents may be used to replace components therein. In particular, as long as there are no structural conflicts, various technical features mentioned in all embodiments may be combined in any manner. The present disclosure is not limited to specific embodiments disclosed herein but includes all technical solutions that fall within the scope of the claims.

What is claimed is:

1. A massage device, comprising:

a first massage body provided with an inlet;

a second massage body;

wherein the first massage body is provided with a massage cavity, the inlet is communicated with the massage cavity, and the massage cavity is configured to massage a first massage area;

the second massage body is connected to the first massage body through a first connection portion, and the first connection portion is located at a position of the first massage body adjacent to the inlet; and the second massage body, is configured to wrap and elastically compress a second massage area, and the first massage area and the second massage area belong to different regions of a human body, wherein the second massage body has a semi-circular sheet-like structure; and a straight edge of the second massage body is connected to half of a circular opening of the first massage body along an edge of the circular opening through the first connection portion, and wherein the straight edge forms a curvature matched with the circular opening, such that both ends of a circular arc edge of the second massage body naturally tilt upward to form a wrapping curved surface.

2. The massage device according to claim 1, further comprising a first vibration assembly provided with a conductive output portion;

wherein the first vibration assembly is disposed on the first connection portion or in an area adjacent to the first connection portion; and the conductive output portion is located in the second massage body and configured to output vibration energy to the second massage body.

3. The massage device according to claim 2, further comprising a second connection portion;

wherein the second connection portion is disposed in the second massage body;

the second connection portion is configured to fix the conductive output portion;

wherein the conductive output portion has both a vibration damping path and a vibration excitation path;

the vibration damping path comprises a first vibration transmission path (L1) from the conductive output portion to the first massage body, and the first vibration transmission path (L1) is a direct vibration transmission path from the conductive output portion to the first massage body;

the vibration excitation path comprises a second vibration transmission path (L2) from the conductive output portion to the second massage body, and the second vibration transmission path (L2) is a direct vibration transmission path from the conductive output portion to the second massage body; and wherein a vibration intensity and/or energy transmitted by the conductive output portion along the vibration damping path is less than a vibration intensity and/or energy transmitted along the vibration excitation path.

4. The massage device according to claim 3, wherein the vibration damping path further comprises a third vibration transmission path (L3);

wherein the third vibration transmission path (L3) comprises a vibration transmission path in any other direction than directions of the first vibration transmission path (L1) and the second vibration transmission path (L2), centered around the conductive output portion.

5. The massage device according to claim 3, wherein the conductive output portion is provided with an embedded rib; and the embedded rib extends in the direction of the vibration excitation path and is embedded into the second massage body.

6. The massage device according to claim 3, wherein an embodiment of the vibration damping path comprises an air gap formed between the first massage body and the conductive output portion.

7. The massage device according to claim 2, wherein a plurality of massage heads are arranged on a surface of the second massage body configured to be in contact with the second massage area;

the massage heads have a flexible sheet-like structure; and the massage heads perform swinging massage in response to vibration energy of the conductive output portion.

8. The massage device according to claim 7, wherein physical parameters of the plurality of the massage heads are gradient-distributed in an arrangement direction; and the physical parameters comprise at least one of hardness, size, and mass;

wherein the physical parameters gradient-distributed enable each of the massage heads to have a differentiated resonance frequency.

9. The massage device according to claim 8, wherein the first vibration assembly is configured to output a first frequency mode, and the first frequency mode excites resonance swinging of a single massage head among the plurality of the massage heads.

10. The massage device according to claim 8, wherein the first vibration assembly is configured to output a second frequency mode, and the second frequency mode simultaneously excites composite resonance swinging of at least two of the massage heads.

11. The massage device according to claim 7, wherein the second massage body comprises a first segment close to the first connection portion and a second segment away from the first connection portion;

a thickness of the first segment gradually decreases from one end close to the first connection portion to one end close to the second segment, such that an inclined surface is formed; and the inclined surface is configured to come into contact with the second massage area.

12. The massage device according to claim 1, further comprising a tapping assembly;

the tapping assembly generates a tapping force via mechanical actuation; and the tapping assembly is configured to tap the second massage body to cause deformation so as to apply a massage force to the second massage area.

13. The massage device according to claim 12, wherein a raised reinforcement portion is arranged on a surface of the second massage body configured to be in contact with the second massage area; and a position of the reinforcement portion corresponds to an acting point where the tapping assembly taps the second massage body.

14. The massage device according to claim 13, wherein a guide groove is formed on an inner wall of the second massage body;

an output end of the tapping assembly extends into the second massage body and the guide groove; and the reinforcement portion is arranged directly opposite to the guide groove.

15. The massage device according to claim 1, wherein the first massage body comprises:

an integrally formed elastic silicone sleeve, inside which the massage cavity is formed, wherein the inlet extends to a surface of the elastic silicone sleeve;

a cup body, configured to enclose an outer surface of the elastic silicone sleeve, wherein the cup body is provided with an opening; and a driving mechanism, configured to act on the elastic silicone sleeve and drive same to perform a massage action;

wherein an inlet of the elastic silicone sleeve extends out of the opening.

16. The massage device according to claim 15, wherein the driving mechanism is configured to drive an inner wall of the massage cavity to vibrate and/or drive the massage cavity to contract and deform periodically.

* * * * *